United States Patent [19]  [11] 4,302,359
Mauldin et al.  [45] Nov. 24, 1981

[54] PROCESS FOR PREPARING MULTIMETALLIC REFORMING CATALYSTS

[75] Inventors: Charles H. Mauldin; William C. Baird, Jr., both of Baton Rouge, La.

[73] Assignee: Exxon Research & Engineering Co., Florham Park, N.J.

[21] Appl. No.: 152,669

[22] Filed: May 23, 1980

[51] Int. Cl.³ .................. B01J 21/04; B01J 23/64; B01J 23/72
[52] U.S. Cl. .................. 252/466 PT; 252/472; 252/474
[58] Field of Search .......... 252/466 PT, 472, 474

[56] References Cited

U.S. PATENT DOCUMENTS

| | | | |
|---|---|---|---|
| 2,802,794 | 8/1957 | Sprauer | 252/466 PT |
| 3,399,148 | 8/1968 | Michael et al. | 252/466 PT |
| 4,082,697 | 4/1978 | Tamm | 252/466 PT |

*Primary Examiner*—W. J. Shine
*Attorney, Agent, or Firm*—Llewellyn A. Proctor

[57] ABSTRACT

A process for the synthesis of catalysts by pre-forming a porous refractory inorganic oxide support, or carrier from a coarse particulate solid, preferably an alumina extrudate, contacting said preformed support with an acid solution, and then treating, contacting and neutralizing said preformed acid treated support with a base prior to the impregnation of said neutralized support with a metal, or metals, hydrogenation-dehyrdogenation component. The preformed solid support ranges at least about 1/32 inch diameter, and preferably at least about 1/16 inch diameter, and larger.

6 Claims, No Drawings

PROCESS FOR PREPARING MULTIMETALLIC REFORMING CATALYSTS

BACKGROUND OF THE INVENTION AND PRIOR ART

Catalytic reforming, or hydroforming, is a process well known to the petroleum refining industry for improving the octane quality of naphthas and straight run gasolines. In a typical process, a series of reactors are provided with fixed beds of catalyst which receive upflow or downflow feed, and each reactor is provided with a heater, or interstage heater, because the reactions which take place are endothermic. A naphtha feed, with hydrogen, or recycle gas, is co-currently passed sequentially through a reheat furnace and then to the next reactor of the series. The vapor effluent from the last reactor of the series is a gas rich in hydrogen, which usually contains small amounts of normally gaseous hydrocarbons, from which hydrogen is separated from the $C_5+$ liquid product and recycled to the process to minimize coke production; coke invariably forming and depositing on the catalyst during the reaction.

Reforming catalysts are recognized as dual functional, the catalyst composite including an acidic component providing an isomerization function, and a metal, or metals, or a compound or compounds thereof, providing a hydrogenation-dehydrogenation (hydrogen transfer) function. Halogen, e.g., chlorine, is generally added to provide the required acid function. The platinum group metals (ruthenium, osmium, rhodium, iridium, palladium and platinum), particularly platinum, have been widely used in commercial reforming operations to provide the hydrogenation-dehydrogenation function, these metals being composited with an inorganic oxide base, particularly alumina; and in recent years promoters such as iridium, rhenium, germanium, tin, etc., have been added, particularly to platinum, to enhance one or more of certain of the characteristics which a good reforming catalyst must possess—viz., activity, selectivity, activity maintenance and yield stability.

The principal reactions produced in reforming are dehydrogenation of naphthenes to produce the corresponding aromatic hydrocarbons; isomerization of n-paraffins to form branched-chain paraffins and isomerization of ring compounds, and dehydrogenation of the latter to form aromatics; dehydrocyclization of paraffins to form aromatics; and hydrocracking of high molecular weight feed constituents to form lower molecular weight, or lower boiling, constituents. The net effect of these reactions is to increase the concentration of aromatics and isomers, with consequent octane improvement of naphthas boiling within the gasoline range. Hydrogenolysis, a specific and severe form of hydrocracking which produces methane, can also occur; and hydrogenolysis is particularly acute in reforming with some promoted platinum catalysts, or new generation bi- or multi-metallic reforming catalysts.

Methods for the preparation of reforming catalysts too are well known. Typically, an alumina or alumina-containing extrudate is prepared by passing an extrudable mixture of alumina and water through orifices of desired diameter within the die plate of an extruder, the extrudate therefrom then being broken or cut into segments of desired length. The extrudate supports are dried, calcined and then contacted with a salt-containing solution, or solutions, and impregnated with sufficient of the salt, or salts, to provide the desired amount of the metal, or metals, hydrogenation-dehydrogenation component. Impregnation aids such as aluminum nitrate or carbon dioxide may be added to the impregnating solution, or solutions, to promote dispersion and distribution of the catalytic metal, or metals, upon the surface of the catalyst. The catalyst is finished by various additional steps such as washing, drying, calcining and other procedures prior to its use in reforming. The halide is generally added simultaneously with the metal, or metals, hydrogenation-dehydrogenation component.

Whereas these types of processes, and catalysts, have performed well it is nonetheless especially desirable to provide new and improved processes, and catalysts, which are capable of achieving higher activities, with satisfactory stability.

It is accordingly a primary objective of the present invention to provide a new and improved process for the preparation of such catalysts for use in upgrading naphthas by reforming them to produce higher octane gasolines.

More specifically, it is an objective to provide a new and improved process for the production of catalysts which, when used at suitable reforming conditions, are more highly active in the production of high octane gasolines, while yet maintaining good selectivity, activity maintenance and yield stability.

These objects and others are achieved in accordance with the present invention embodying a process for the synthesis of reforming catalysts by pre-forming a porous refractory inorganic oxide support, or carrier from a coarse particulate solid, preferably an alumina extrudate, contacting said preformed support with an acid solution, and then treating, contacting and neutralizing said preformed acid treated support with a base prior to the impregnation of said neutralized support with a metal, or metals, hydrogenation-dehydrogenation component. The preformed solid support ranges at least about 1/32 inch diameter, and preferably at least about 1/16 inch diameter, and higher.

Surprisingly, it has been found that the sequence of acid treating a solid, porous refractory inorganic oxide support with subsequent neutralization of the acid-treated support prior to the addition of a metal, or metals hydrogenation-dehydrogenation component to the support results in the formation of more highly active catalysts. It is essential that the support be preformed, and that the preformed support be treated prior to metals impregnation by contact with an acid solution, preferably a halogen acid solution, without dissolving any significant portion of said support. Thereafter the acid treated, preformed support is neutralized by contact with a base, preferably a weakly basic solution, e.g., an ammonium hydroxide solution; again, without dissolving any significant portion of said support. Suitably, the neutralized preformed support is then impregnated with the desired hydrogenation-dehydrogenation component, e.g., by the addition of a metal from a single solution, or by the addition of more than one metal, e.g., either by simultaneous impregnation from a single solution or by sequential impregnation from several solutions to which different metals have been added. The catalyst thereafter is washed, dried, calcined or otherwise treated in conventional manner. The catalyst so produced is far superior, and consistently superior, to one prepared by a similar impregnation of the support with a given metal, or metals, except that the support was not neutralized by contact with a base after acidification. Whereas there is no desire to be bound by a specific theory of mechanism, it is believed that the acid treatment with subsequent neutralization provides an "activated" surface, or surface more amenable to the more efficient dispersion and distribution of the metal, or metals, hydrogenation-dehydrogenation components. It is also believed that this treatment changes the acid strength distribution of the support providing a surface with an improved cracking character.

The support is constituted of a porous refractory inorganic oxide, particularly alumina, or alumina containing portions of other well known refractory inorganic oxides such as silica, zirconia, magnesia, etc. in the form of pills, pellets, beads, extrudates, or sieved particulate support materials. Preferred supports have an apparent bulk density of about 0.3 to about 0.8 g/cc and surface area characteristics such that the average pore diameter is about 20 to 300 Angstroms, the pore volume ranges about 0.1 to about 1 cc/g and the surface area ranges about 100 to about 400 m$^2$/g. In general, best results are obtained with a gamma-alumina support material which is used in the form of extrudate particles having an average diameter equal to or greater than 1/32 inch, preferably about 1/16 inch, an apparent bulk density of about 0.3 to about 0.8 g/cc., a pore volume of about 0.4 ml/g., and a surface area of about 150 to about 250 m$^2$/g.

The preferred alumina support material may be prepared in any suitable manner and may be synthetically prepared or natural occurring, preferably the former. Whatever type of alumina is employed, it may be activated prior to use by one or more treatments including drying, calcination, steaming, etc., and it may be in a form known as activated alumina, activated alumina of commerce, porous alumina, alumina gel, etc. For example, the alumina support may be prepared by adding a suitable alkaline reagent, such as ammonium hydroxide, to a salt of aluminum such as aluminum chloride, aluminum nitrate, aluminum alkoxide, aluminum sulfate, etc., in an amount to form an aluminum hydroxide gel which upon drying and calcining is converted to alumina. The alumina support may also be prepared by precipitation of sodium aluminate alone or combined with other aluminum salts. The alumina supports so prepared may or may not contain sodium and/or sulfate impurities.

The calcined alumina extrudates are soaked in an acid solution. Suitable acids include inorganic acids, exemplary of which are nitric acid, phosphoric acid, hydrochloric acid, hydrobromic acid and the like. Hydrochloric and nitric acids are preferred. The acid may range in strength from about 0.1–15.6 N; 1–5 N being preferred and 1 N being most preferred. The soaking period may range from about 1 to about 24 hours, from about 10 to about 20 hours being generally preferred. Generally, ambient conditions are employed.

Exposing the alumina to a halogen acid, e.g., hydrochloric acid, introduces high levels of chloride into the alumina base. This high chloride content inhibits subsequent metals impregnation, and the finished catalyst gives high acid cracking in naphtha reforming. Chloride is effectively removed from the acid treated alumina by the subsequent neutralization. Similarly, residual nitric acid on the surface of the support also inhibits the impregnation of the metals. For this reason nitric acid treatment of the support must also be followed by neutralization.

After the acid treatment, the support is usually washed to remove the excess acid. Thereafter, the support is contacted with, or immersed in a basic solution of normality ranging from about 0.1 N to about 15 N, preferably from about 0.1 N to about 5 N. The contact, or soak period can range from about 0.1 hour to about 24 hours, preferably from about 1 hour to about 5 hours. One hour is generally sufficient, and is most preferred. Exemplary of the bases which can be employed are ammonium hydroxide, organic amines, quaternary ammonium bases and the like. Inorganic hydroxides, carbonates and other bases are less suitable due to the contamination of the alumina by the metal ions, these depressing the activity of the finished catalyst. Aqueous solutions of organic amines and quaternary ammonium bases are also less suitable because of the possibility of nitrogen poisoning the alumina. Ammonium hydroxide is most preferred, and preferably the support is contacted with ammonium hydroxide by soaking at ambient conditions for the desired time. The strength of the ammonium hydroxide solution ranges from 0.1–15 N; a range of 0.1–5 N being preferred; 0.5–1.0 N being most preferred. A soaking period ranging from 5–60 min. is generally adequate, 60 min. being preferred.

In preparation of the catalyst, the neutralized inorganic oxide support, in dry or solvated state, is next contacted, with a solution which contains a compound or salt, or compounds or salts, of the desired catalytic metal, or metals, and thereby impregnated by absorption from a dilute or concentrated solution to effect uptake of the metal component, or components, with subsequent filtration or evaporation. The metal, or metals, is contained in the solution in the form of any of the common inorganic or organic salts of the elemental metal. These include the halides, nitrates, nitrites, sulfates, sulfites, carbonates, hydroxides, bicarbonates or carboxylates, preferably the fluorides, chlorides, nitrates, nitrites, and hydroxides; and including the oxides. The more preferred salts are the fluorides, chlorides, and nitrates due to their availability, low cost, and ready solubility in aqueous media.

The preferred catalyst is one which contains a platinum component, generally in concentration ranging from about 0.1 percent to about 2 percent, preferably from about 0.2 percent to about 0.6 percent, based on the weight of the catalyst (dry basis). The preferred catalyst generally also contains a promoter metal, preferably iridium or rhenium, generally in concentration ranging from about 0.1 percent to about 2 percent, preferably from about 0.2 percent to about 0.6 percent, based on the weight of the catalyst (dry basis). Preferably, the platinum and promoter metal are employed in weight ratios of platinum:promoter metal ranging from about 0.25:1 to about 3:1, more preferably from about 0.75:1 to about 1.25:1; and most preferably is employed in substantially equal weight ratios when the total content of these metals ranges from about 0.4 percent to about 1 percent, based on the total weight of the catalyst (dry basis). The halogen content of the catalyst generally ranges from about 0.1 to about 2.5 percent, preferably from about 0.7 to about 1.2 percent, based on the weight of the catalyst (dry basis).

Copper can also be incorporated with the support in small and critical concentrations by impregnation from a halogen acid solution as disclosed in U.S. Ser. No. 53,374, filed June 29, 1979; hereby incorporated by reference. Suitably, a sufficient amount of a copper-containing compound is impregnated into the support to provide from about 0.01 to about 0.1 percent copper, preferably from about 0.025 to about 0.08 percent copper, based on the weight of the catalyst (dry basis). A preferred catalyst is one which, besides copper, contains platinum and rhenium in specified concentrations. The copper is composited in amount sufficient to provide a molar ratio of copper:(platinum plus rhenium) ranging from about 0.02:1 to about 0.25:1, preferably from about 0.04:1 to about 0.20:1. The exact concentration of the copper depends to some extent on the nature of the feedstock and reforming conditions, but it is important that the concentration of copper on the catalyst be controlled to the proper level. High concentration of copper acts as a poison and depresses catalyst activity.

While the catalyst may be used directly, it is preferred that it be sulfided to achieve the ultimate suppression of hydrocracking during reforming. Sulfur eliminates principally the formation of excessive methane, and copper eliminates principally the formation of the $C_2+$ hydrocarbon gases. Together, a given amount of both copper and sulfur prove superior in the suppression of total hydrocracking than a corresponding amount of either copper or sulfur employed individually. The sulfur content of the catalyst generally ranges to about 0.2 percent, preferably from about 0.05 percent to about 0.1 percent, based on the weight of the catalyst (dry basis). The sulfur can be added to the catalyst by conventional methods, suitably by breakthrough sulfiding of a bed of the catalyst with a sulfur-containing gaseous stream, e.g., hydrogen sulfide in hydrogen, performed at temperatures ranging from about 350° F. to about 1050° F. at pressures ranging about 1–40 atmospheres for the time necessary to achieve breakthrough, or the desired sulfur level.

Impregnation of the metals is accomplished by any conventional means. Both the incipient wetness technique and soaking in an excess of the impregnation medium are acceptable. The impregnation of the metal components into a support is carried out by impregnating the support with a solution, or solutions, of the respective salts or compounds of the elements or metals to be incorporated. Salts, acids or compounds of each metal can be dissolved in a solution, or the salts, acids or compounds can be separately dissolved in solutions, the solutions admixed, and the admixed solution used for impregnation of the carrier. One metal can be added initially using conventional techniques, and then another metal, or metals, can be added simultaneously or sequentially, suitably by impregnation. The amount of impregnation solution used should be sufficient to completely immerse the carrier, usually within the range from about 1 to 20 times that of the carrier by volume, depending on the metal concentration in the impregnation solution. The impregnation treatment can be carried out under a wide range of conditions including ambient or elevated temperatures and atmospheric or superatmospheric pressures.

The catalyst, after impregnation, is dried by heating at a temperature above about 80° F., preferably between about 150° F. and 300° F., in the presence of nitrogen or oxygen, or both, in an air stream or under vacuum. The catalyst is calcined at a temperature between about 500° F. to 1200° F., preferably about 500° F. to 1000° F., either in the presence of oxygen in an air stream or in the presence of an inert gas such as $N_2$.

The catalyst can be activated by contact with air at temperatures ranging from about 500° F. to about 1050° F. for periods ranging from about 1 to about 24 hours in either flowing or static air. Reduction is performed by contact with flowing hydrogen at temperatures ranging from about 350° F. to about 1050° F. for periods ranging from about 0.5 to about 24 hours at about 1–40 atm. The catalyst can be sulfided by use of a blend of $H_2S/H_2$ and performed at temperatures ranging from about 350° F. to about 1050° F. at about 1–40 atm. for a time necessary to achieve breakthrough, or the desired sulfur level. Post-sulfiding and stripping can be employed if desired at conditions similar to those for reduction of the catalyst.

Treatment of the catalyst with a mixture of chlorine and oxygen can be substituted for air activation if desired. This procedure can correct for any possible maldispersion of the metals arising from improper impregnation, and the procedure is useful in restoring activity during regeneration-rejuvenation after on oil service. A blend of chlorine, oxygen and nitrogen can also be employed at temperatures ranging from about 350° F. to about 1050° F. for periods ranging from about 1 to about 24 hours at 1–40 atm. Treat times for these various operations is a function of gas flow rates, gas compositions, and conditions. The catalyst halide content can be controlled during impregnation, or adjusted by treatment with water or water-hydrogen chloride blends.

This catalyst can be used in semi-regenerative, cyclic, semi-cyclic, or continuous bed reforming. The catalyst is particularly useful at severe reforming conditions, especially at low pressures, or pressures ranging from about 50 psig to about 150 psig, where maximum yield is favored.

The feed or charge stock can be a virgin naphtha, cracked naphtha, a Fischer-Tropsch naphtha, or the like. Typical feeds are those hydrocarbons containing from about 5 to 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 20 to about 80 Vol. % paraffins, both normal and branched, which fall in the range of about $C_5$ to $C_{12}$, from about 10 to 80 Vol. % of naphthenes falling within the range of from about $C_6$ to $C_{12}$, and from 5 through 20 Vol. % of the desirable aromatics falling within the range of from about $C_6$ to $C_{12}$.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
|---|---|---|
| Pressure, Psig | 50–750 | 100–300 |
| Reactor Temp., °F. | 750–1100 | 850–1000 |
| Gas Rate, SCF/B (Incl. Recycle Gas) | 1500–10,000 | 2000–7000 |
| Feed Rate, W/W/Hr | 0.5–10 | 1–3 |

The invention will be more fully understood by reference to the following demonstrations and examples which present comparative data illustrating its more salient features. All parts are given in terms of weight except as otherwise specified.

EXAMPLES

A series of catalysts were prepared from commercially supplied 1/16" high purity gamma alumina extrudates calcined in air at 1000° F. for 3 hours prior to use.

Catalyst A

To a solution of 37.5 ml of concentrated hydrochloric acid and 412.5 ml of water was added 291 g. of 1/16 inch alumina extrudates. After 20 hrs. the extrudates were recovered by filtration and washed with two liters of water to remove the hydrochloric acid. The extrudates were added to a solution of 33 ml of concentrated ammonium hydroxide and 417 ml of water. After 1 hr. the extrudates were recovered by filtration and washed with eight liters of water to remove ammonium hydroxide. In a two liter fritted glass filter funnel was placed 450 ml of water. Carbon dioxide was bubbled up through the frit for 30 min. The extrudates were added to the water, and the mixture was treated with carbon dioxide for 30 min. An aqueous solution (70 ml) containing 2.101 g. of $PdCl_4$, 1.215 g. of $HReO_4$, 0.210 g. of $H_2PtCl_6$, and 3 g. of HCl was added with stirring, and carbon dioxide was bubbled through the mixture for 4 hrs. The aqueous phase was removed by decantation, and the catalyst was dried in a vacuum oven at 266° F. for 24 hrs. The catalyst was calcined in a muffle furnace at 1000° F. for 3 hrs. The catalyst was ground to a particle size of 14–35 mesh. A 25 g. sample was placed in a quartz reactor and was treated at 932° F. with the following gases at a uniform flow rate of 600 cc/min: $H_2$, 1 hr.; 0.2% $H_2S$ in $H_2$, 7 min.; $H_2$, 2 hrs. The composition of the catalyst is given in Table I.

Catalyst B

This catalyst was prepared in the same manner as Catalyst A except the alumina extrudates were not treated with hydrochloric acid and ammonium hydroxide prior to impregnation. The composition of the catalyst is given in Table I.

Catalyst C

A Pt-Re catalyst was prepared using the procedure described for Catalyst A, the procedure of this invention. The composition of the catalyst is given in Table I.

Catalyst D

A Pt-Re catalyst was prepared using the procedure described for Catalyst B. The composition of the catalyst is given in Table I.

Catalyst E

A Pt-Re catalyst was prepared using the procedure described for Catalyst A, the procedure of this invention, except 30 ml. of concentrated nitric acid and 420 ml. of water were used to treat 291 g. of extrudate. The composition of the catalyst is given in Table I.

TABLE I

| Components | Cat A | Cat B | Cat C | Cat D | Cat E |
|---|---|---|---|---|---|
| Platinum | 0.11 | 0.098 | 0.3 | 0.3 | 0.3 |
| Rhenium | 0.26 | 0.21 | 0.3 | 0.3 | 0.3 |
| Palladium | 0.29 | 0.31 | — | — | — |
| Chlorine | 0.86 | 0.86 | 0.90 | 0.9 | 0.8 |
| Sulfur | 0.085 | 0.056 | 0.053 | 0.08 | 0.10 |

Catalyst A and B were each then contacted at reforming conditions in separate runs with heptane and naphtha feeds, respectively, the inspections on the petroleum naphtha being given in Table II.

TABLE II

| ASTM Distillation, °F. | |
|---|---|
| Initial | 145 |
| 10 | 181 |
| 20 | 204 |
| 30 | 222 |
| 40 | 240 |
| 50 | 258 |
| 60 | 275 |
| 70 | 293 |
| 80 | 313 |
| 90 | 334 |
| Final B.P. | 363 |
| Octane No. RON Clear | 34.8 |
| Gravity, °API | 59.7 |
| Sulfur, Wt. ppm | <0.1 |
| Water, Wt. ppm | <10 |
| Chloride, Wt. ppm | <0.1 |
| Analysis, Vol. Percent | |
| Paraffins | 69.4 |
| Naphthenes | 16.7 |
| Aromatics | 13.9 |

The results of the reforming runs are given in Tables III-A and III-B, respectively.

TABLE III-A

Heptane Reforming
1 Atm., 500° C., 2.5 W/H/W, $H_2$/Heptane 37/1

| | | Selectivity, wt. % | | | |
|---|---|---|---|---|---|
| Catalyst | Conversion, % | $C_6^-$ | Iso—$C_7$ | Benzene | Toluene |
| A | 77.3 | 13.9 | 4.0 | 0.9 | 81.2 |
| B | 70.2 | 23.0 | 6.3 | 2.2 | 68.5 |

The activity of Catalyst A, the catalyst made pursuant to this invention, as measured by conversion, was far greater than the activity of Catalyst B. Selectivity was also greatly improved by the process of this invention. Thus, Catalyst A gave a product of greater aromatic content than did Catalyst B. Catalyst A thus gave a 63.5% yield of aromatics vs. a yield of 49.6% for Catalyst B.

Both catalysts were evaluated for naphtha reforming; the results are shown below. The activity and yield credits for Catalyst A, observed in heptane reforming, are equally apparent in naphtha reforming.

TABLE III-B

Reforming of Low Sulfur Fos Paraffinic Feed With Pd/Re/Pt

| Catalyst | Relative Activity (400 hr.) | $C_5^{30}$ LV% @ 100 RON (4000 Hr.) |
|---|---|---|
| A | 1.5 | 71.6 |
| B | 1.0 | 63.3 |

Catalyst A prepared by the procedure of this invention is clearly the superior catalyst.

Catalyst C and D were evaluated in heptane reforming, with the results given in Table IV.

TABLE IV

Heptane Reforming
500° C., 100 psig, 10 W/H/W, $H_2$/Heptane = 5

| Catalyst | $C_5^+$ Yield, % | Toluene Yield, % |
|---|---|---|
| C | 79.7 | 34.1 |
| D | 77.5 | 26.0 |

Catalyst C prepared by the procedure of this invention is obviously superior in activity and yield to Catalyst D.

Catalyst D and E were evaluated in heptane reforming with the results given in Table V.

TABLE V

Heptane Reforming
500° C. 100 psig, 10 W/H/W, $H_2$/Heptane = 5

| Catalyst | $C_5^+$ Yeild, % | Toluene Yield, % |
|---|---|---|
| D | 77.5 | 26.0 |
| E | 78.5 | 29.0 |

Catalyst E, prepared by the procedure of this invention, is superior in activity and yield to Catalyst D.

It is apparent that various modifications and changes can be made without departing from the spirit and scope of the present invention.

Having described the invention, what is claimed is:

1. A process for the preparation of platinum-rhenium reforming catalysts which comprises
   pre-forming an inorganic oxide support of particle size diameter of at least about 1/32 inch in diameter,
   contacting said support with an acid solution without dissolving any significant amount of said support,
   neutralizing said acid treated support without dissolving any significant amount of said support,
   impregnating said neutralized support by contact thereof with a solution containing platinum and rhenium compounds, and then
   drying and calcining said impregnated support to form said catalyst.

2. The process of claim 1 wherein the inorganic oxide support is alumina.

3. The process of claim 1 wherein the acid is hydrochloric acid or nitric acid.

4. The process of claim 1 wherein the acid treated support is neutralized with ammonium hydroxide.

5. The process of claim 1 wherein the inorganic oxide support is alumina, the acid is hydrochloric acid or nitric acid, and the acid treated support is neutralized with ammonium hydroxide.

6. The process of claim 1 wherein the platinum-rhenium catalyst is promoted with palladium or copper or an admixture of palladium and copper.

* * * * *